United States Patent [19]

Garr et al.

[11] 4,183,725
[45] Jan. 15, 1980

[54] METHOD AND APPARATUS FOR MELTING GLASS IN BURNER-HEATED TANKS

[75] Inventors: Hans Garr, Steinbach; Ulrich Hoffman, Eschborn, both of Fed. Rep. of Germany

[73] Assignee: Battelle Development Corporation, Columbus, Ohio

[21] Appl. No.: 829,571

[22] Filed: Aug. 31, 1977

[30] Foreign Application Priority Data

Sep. 4, 1976 [DE] Fed. Rep. of Germany ....... 2639977

[51] Int. Cl.² .............................................. F27B 14/00
[52] U.S. Cl. ...................................................... 432/13
[58] Field of Search ............................................. 432/13

[56] References Cited

U.S. PATENT DOCUMENTS

| 3,206,526 | 9/1965 | Rygaard | 432/13 |
| 3,969,068 | 7/1976 | Miller et al. | 432/13 |

Primary Examiner—John J. Camby
Attorney, Agent, or Firm—Thomas W. Winland; Kenneth E. Shaweker

[57] ABSTRACT

In a method of melting glass in burner-heated glass melting tanks wherein preheated pellets comprised of quartz, sand, sodium carbonate, potassium carbonate, lime, and magnesium oxide ae injected by a pressurized gaseous medium into a glass melt contained in the tanks, the improvement comprising injecting the pellets in a manner adapted to form a veil-like formation above the melt extending over substantially the entire melt surface and over substantially all of the burner flames.

7 Claims, 4 Drawing Figures

METHOD AND APPARATUS FOR MELTING GLASS IN BURNER-HEATED TANKS

BACKGROUND OF THE INVENTION

I. Field of the Invention

The invention relates to a method for melting glass in one or several burner-heated tanks by preheating and feeding pellets formed of the batch to be molten into the tank by means of a gaseous medium under pressure. The invention relates also to a device for carrying out the method according to the invention.

II. Description of the Prior Art

According to conventional methods the batch or agglomeration to be molten and consisting essentially of sand, sodiumcarbonate, potassium, carbonate, lime, and magnesium oxide—either cold or preheated—is introduced into the glass melt at regular intervals of time or continuously. These methods have the drawback that the batch floating on the surface of the melt impedes the transfer of heat from the burners to the glass, which substantially delays the melting and refining process. The melting capacity of the furnace system used, including the tank and the attainable quality of the glass, depend, however, on the melting rate and the degree of refining.

On the other hand, the conventional arrangement of the heat sources or burners between the floating batch blanket and the crown of the furnace leads to extremely high temperatures in the upper part of the furnace and the crown. This in turn results in heavy corrosion of the refractory material of the furnace having not only a detrimental effect on the service life of the plant but also favoring the formation of glass defects. In addition, the high temperatures in the upper part of the furnace naturally lead to high heat losses and thus high energy consumption Another known type of melting furnace is electrically heated providing the heat sources in the glass melt; this design does, however, not allow the use of burners. This electric melting process yields glass of high quality, but because of the high cost of electric energy it is used only for the manufacture of high-quality special glasses.

The object of the invention therefore is to provide a method of the kind outlined above being superior to conventional methods in particular in that it consumes substantially less energy and/or having a higher melting rate. It is another object of the invention to improve the quality of glass produced with burner-heated tanks.

SUMMARY OF THE INVENTION

It has been found that the objects can be achieved in a technically very advanced manner by the present invention by feeding the batch into the melt by spraying the pellets in such a way that they form a veil-like formation above the melt which extends in essence over the entire surface of the melt and above the flames of essentially all of the burners before entering the melt. As a result of the invention the flames are surrounded by the melt and the batch, insuring an excellent heat transfer into the melt and shielding the crown and upper parts of the furnace against excessive heat influence.

As a rule, the veil-like formation enters the melt at the side opposite to the melt outlet, the flight direction of the preheated pellets being opposite to that of the withdrawal current; of the melt; feed-in and melt flow thus follow the countercurrent principle. As an alternative, the flight direction of the particle forming the veil-like formation can, however, also correspond to the withdrawal current of the glass melt. In this case feed-in of the pellets and melt flow do not occur according to the countercurrent principle.

According to an advantageous embodiment of the method covered by the invention, the pellets are fused in the flame of the injection device. To save even more energy, it is of advantage to preheat the gaseous medium under pressure, being preferable compressed air, used for pellet injection and the pellets themselves regeneratively or recuperatively with the waste gases formed in the tank.

A favorable furnace for carrying out the method according to the invention comprises a cross-fired tank equipped with one or several injection burners which are arranged above the level of sideport burners.

Typically such injection burners for feeding in the pellets consist essentially of a batch hopper for the pellets, a cooled burner shaft, a burner nozzle and a high-temperature-resistant burner head, where mixing of the pellets with the gas mixture containing flue gas and air (typically with the compressed air is being enriched with oxygen) as well as flame formation take place; pellet transport through the burner shaft is effected by means of compressed air introduced into the batch hopper with an additional line.

With the method according to the invention, the batch pellets, which are completely or largely melted during the flight through the flame, are completely fused and homogenized in the melt within a very short period of time. The batch veil in addition acts as a screen against the thermal radiation from the burner-heated tank towards the crown of the furnace and thus contributes decisively to the desired reduction in heat losses. Part of the thermal radiation is reflected by the batch pellet veil and thus accelerates the melting and refining process in the glass melt. The thermal energy absorbed by the batch in the veil is led back into the melt by the pellets.

The heat absorbed by the veil-forming pellets during their flight in the flame of the injection burner shortens the residual melting process in the tank to a considerable extent and thus—compared with conventional methods with the same energy consumption—leads to an increased melting rate or—at approximately the same melting rate—permits a substantial reduction in melter or tank size, which also results in a saving of energy.

As the particles reach the melt in the tank in a pre-molten or molten state, it is impossible to form a batch blanket on the glass melt, unlike in the case of conventional batch feed-in; as a result, the heat transfer from the heat sources to the glass melt is facilitated and the quality of the glass improved.

Other features, advantages and potential applications of the invention follow from the subsequent presentation of further details and from the description of embodiments on the basis of the accompanying schematic drawings.

DESCRIPTION OF THE PREFERRED EMBODIMENTS

Figure 1:
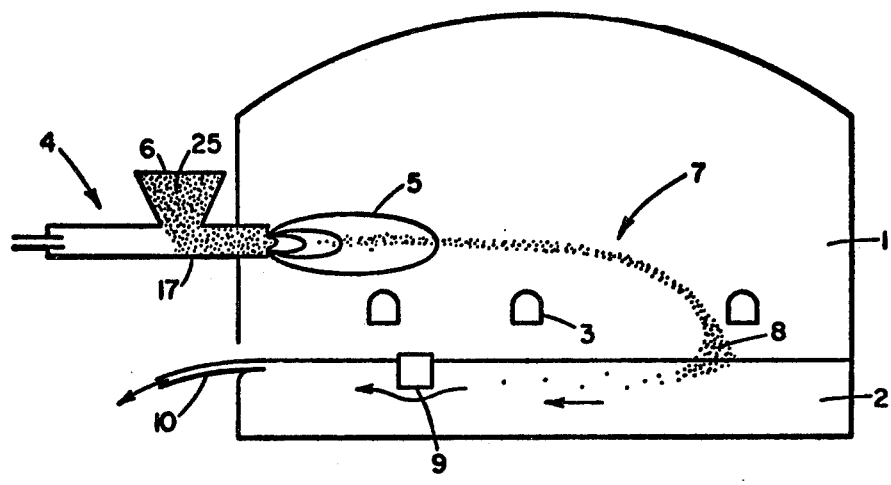
FIG. 1 is a cross-section of a single-compartment melting tank.

As can be seen from FIG. 1, the device for carrying out the method according to the invention in this example consists mainly of a cross-fired tank 1 which contains the glass melt 2. The cross-fired tank 1 is equipped with three conventional burners 3, which are heated with oil or gas. The batch is injected in forms of pellets 25 through an injection burner 4; in general, several injection burners will be used simultaneously to inject the batch.

The burners 3 are all arranged at the same level, but below the level of the injection burner 4. It has been found useful to arrange the direction of the flames of burners 3 normal to the direction of the flame 5 of the injection burner 4.

Under the method according to the invention, the batch is injected or fed-in the form of pellets, whose diameters range e.g. between 3 and 8 mm. It is of advantage to effect or assist the injection with compressed air, which is recuperatively or regeneratively preheated with the waste or flue gases from the melter or tank 1 to such an extent that the pellets 25 already reach a temperature of about 400° C. in the batch feeder or in the batch hopper 6 of the injection burner 4.

The formation of such pellets is conventional and known to a person skilled in the art. It can be achieved for instance by mechanical solidification, as under pressure, chemical-physical binding, as with hydrate formation out of sodium carbonate and/or potassium carbonate by adding the water and subsequent drying, by addition of acqueous sodium hydroxide (NaOH) and/or potassium hydroxide and subsequent drying, and by addition of binding agents, like tar products, see, for instance, Yamamoto, J., Komatsu, E. ... "Granulieren von Glasgemenge", The Glass Ind. 49 (1968) No. 9, pp 491–493, and Daniels, M., "Einschmelzverhalten von Glasgemenge", Glastechn. Berichte 46 (1973), pp 40–46. The batch itself again is conventional in the art of glass production and consists essentially of sand ($SiO_2$), potassium carbonate, sodium carbonate, lime, magnesium oxide among other consistents and possibly color agents.

Before the batch pellets 25 ejected from the injection burner 4 enter the melt 2, they form a veil 7 or veil-like formation extending as far as possible over the entire surface of the melt, which contributes greatly to the saving in energy which is the objective of the present invention. The batch pellets 25 ejected from the injection burner 4 are premolten during their flight in flame 5. The melting process continues as a result of the thermal radiation and convection inside tank 1 during the whole duration of their flight, i.e. until the pellets 25 enter the melt. The direction of flow of the melt 2 is opposite to the direction of injection or flight of the pellets forming the veil 7. After entrance of the veil 7 into the melt 2 in area 8 the melting of the batch is continued and completed in the withdrawal current of the melting glass 2. Stoppers 9 used in the withdrawal current of the melt in tank 1 withhelding solid particles on the surface of the melt 2 are conventional floaters, rings or the like. The glass melt outlet 10 underneath the injection burner 4 is also shown in FIG. 1.

In the embodiment of the device according to the invention depicted in FIG. 2, the injection burner 11 is positioned between the melter 12 and the refiner 13 of a two-compartment tank with floater. The retaining devices for batchrelics between melter 12 and refiner 13 in this case have the form of one or several floaters 14. As in the embodiment according to FIG. 1, the batch is again injected in form of the pellets 25 in a direction opposite to that of the outflowing glass melt; the direction of flow of the melt 2 is shown in FIG. 2 by arrows 15. In all other respects, the two-compartment tank with floater(s) according to FIG. 2 is of a conventional design; the energy required for melting—except that required for preheating the pellets and injecting them by means of the injection burner 11—is generated by the gas-or oil-heated side-port burners 16.

Figure 2A:
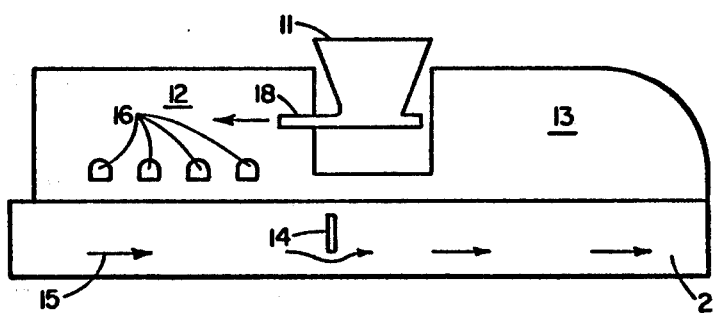
FIG. 2 is a cross-section (FIG. 2a) and top view (FIG. 2b) of a two-compartment tank with floater and constriction.
Figure 2B:
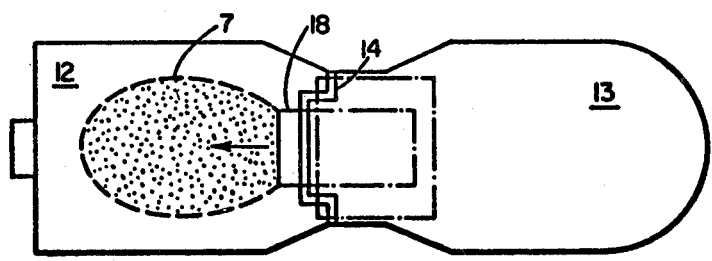

The construction of the two-compartment tank with floater(s) in its middle section, see FIG. 2b, is to prevent stagnation of the outflowing glass melt in the corners of the tank, in order to avoid melting irregularities.

Figure 3:
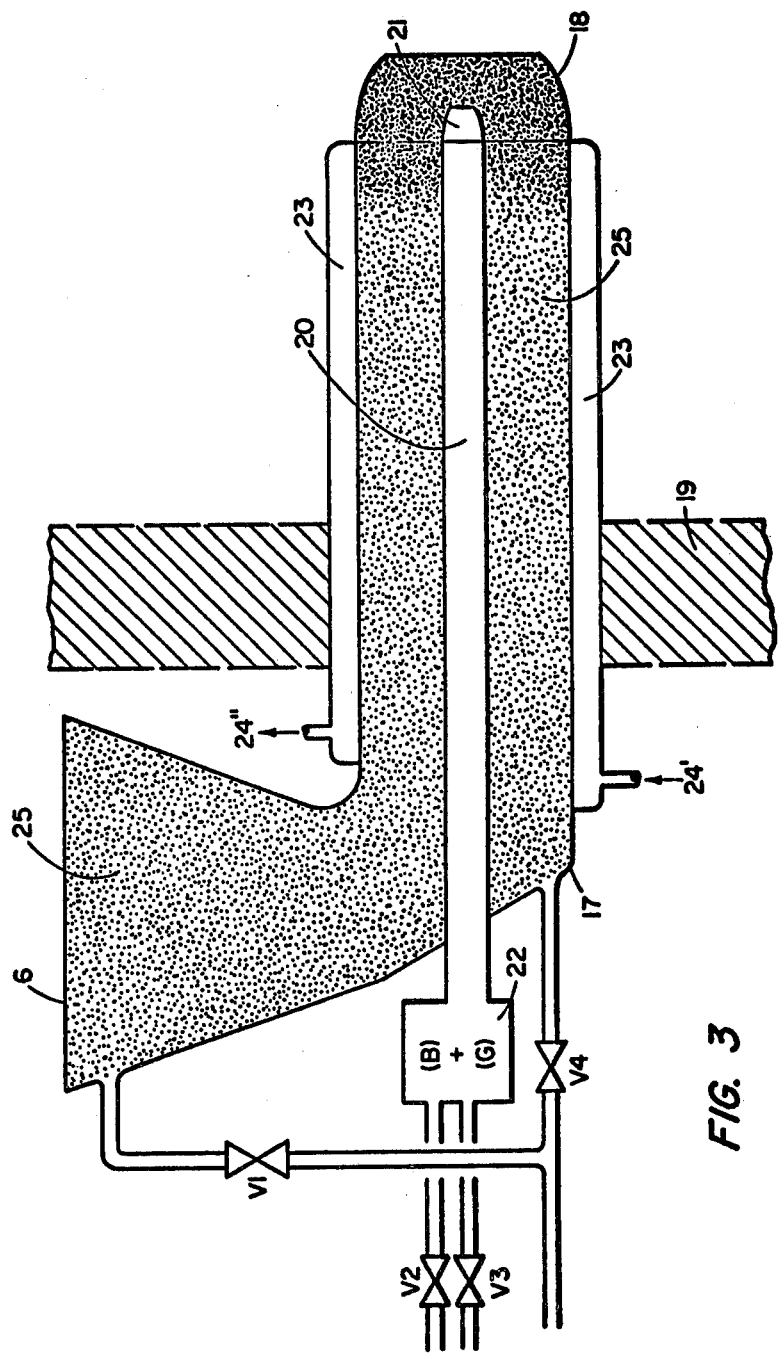
FIG. 3 is an enlarged sectional view of an injection burner according to the invention.

The design principle of the injection burner which is an essential component of the device according to the invention, is depicted in FIG. 3. The basic design and the operation of these burners correspond to those of the well-known flame-spray or injection burners, although burners of the type covered by the present invention, as they serve as injection devices for the batch, of course have larger dimensions and, as will become obvious from the following statements, differ in their design features from the flame-spray burner.

The injection burner according to the present invention (of FIG. 3) consists essentially of a batch hopper 6 for the pellets, an elongated burner shaft 17, the burner nozzle 21 and a burner head 18. The hole for the horizontally arranged burner shaft 17 in the end wall 19 (dashed line) of the melter is also shown in FIG. 3. The part of the burner shaft 17 which extends into hot furnace through the end wall 19 of the melter is provided with a cooling jacket 23, through which a coolant, e.g. water or air is passed in the direction of the arrows shown at the inlet 24' and outlet 24". The fuel gas, e.g. natural gas or coke oven gas, is fed into the injection burner according to FIG. 3 through the valve V 3. It enters the mixing chamber 22 and from there goes on through the central tube 20 in the burner shaft 17 to the burner head 18, after having been mixed with air or oxygen and having passed through the valve V 2.

In the case of the burner according to FIG. 3, injection of the batch pellets 25 and transport of the pellets through the injection burner is aided by preheated compressed air, which is introduced into the batch hopper 6 through valve V 1. Part of the compressed air is passed directly into the burner shaft via valve V 4 and from there, together with the batch, forwarded into the burner head 18.

Mixing of the batch takes place in the burner head 18 and mixing of fuel gas and oxygen in the mixing chamber.

In order to provide the desired veil-like formation of the injected pellets 25 above the surface of the melt and the level of the side-port burners 3, 16 one or more nozzles 21 can be provided in a horizontal plane; it is, however, preferred to use one slit-like nozzle 21, see FIG. 2a+b, resulting in a veil 7 as shown schematicly also in FIG. 2b.

Hence, the devices necessary for carrying out the method according to the invention are astonishingly simple and thus also easy to manufacture, although they permit substantial energy savings in glass melting and in addition an improvement in the quality of the resultant glass.

The present tests enable an estimate that the energy consumption using the method according to the invention will be approximately 5 495 Btu per kilogram of glass, whereas the energy consumption with conventional methods is approximately 10205 Btu per kilogram of glass. Accordingly with the method under the invention an energy saving of approximately 46% can be achieved.

Since many variations, modifications and changes in detail may be made to the described embodiments, it is intended that all matter in the foregoing description and accompanying drawings be interpreted as illustrative and not in a limiting sense.

We claim:

1. A method for producing molten glass in a melting furnace comprised of both a glass melting tank heated by a plurality of overhead burners and at least one injection burner positioned above the tank at a level above that of the overhead burners, which comprises the steps of:
    (a) introducing preheated pellets comprised of glass-forming batch components into the injection burner; and,
    (b) ejecting the pellets from the injection burner through the flame thereof under the force of a pressurized gaseous medium, whereby the ejected pellets are prefused in the injection burner flame prior to entering the molten glass melt contained in the tank, and whereby the prefused pellets form a veil-like formation which extends over substantially the entire melt surface and over substantially all of the overhead burner flames.

2. Method according to claim 1, wherein the veil-like formation enters the molten glass melt at the side opposite to the melt outlet, and the direction of flight of the pellets forming the veil-like formation is opposite to the direction of flow of the melt out of the tank.

3. Method according to claim 1 wherein the direction of flight of the pellets forming the veil-like formation corresponds to the direction of the withdrawal current of the molten glass melt.

4. Method according to claim 1, wherein the gaseous medium under pressure for injecting the pellets is compressed air and the pellets are preheated with the waste gases formed in the tank.

5. Method according to claim 1, wherein the air for the flame is enriched with oxygen.

6. Apparatus for producing molten glass from pellets comprised of glass-forming batch components, comprising:
    (a) glass melting tank means heated by a plurality of overhead burners;
    (b) at least one injection burner means positioned above the tank at a level above that of the overhead burners, said injection burner being adapted to eject said pellets through the flame thereof under the force of a pressurized gaseous medium, so that, in operation, the ejected pellets are prefused in the injection burner flame prior to entering the molten glass melt contained in the tank, and the prefused pellets form a veil-like formation which extends over substantially the entire melt surface and over substantially all of the overhead burner flames;
    (c) means for introducing the pellets into the injection burner; and
    (d) means for preheating the pellets prior to their introduction into the injection burner.

7. Apparatus according to claim 6, wherein the injection burner consists essentially of a pellet hopper, a cooled burner shaft, a burner nozzle, and a high-temperature resistant burner head where mixing of the pellets with the combustion gases and flame formation take place, the pellet transport through the burner shaft being effected by means of gaseous medium under pressure introduced to the pellet hopper.

* * * * *

UNITED STATES PATENT OFFICE
CERTIFICATE OF CORRECTION

PATENT NO. : 4,183,725
DATED : 1/15/80
INVENTOR(S) : Hans Gaar and Ulrich Hoffmann It is certified that error appears in the above-identified patent and that said Letters Patent are hereby corrected as shown below:

Inventors: change "Garr" to -- Gaar --.
change "Hoffman" to -- Hoffmann --.

Signed and Sealed this

Tenth Day of June 1980

[SEAL]

Attest:

SIDNEY A. DIAMOND

Attesting Officer

Commissioner of Patents and Trademarks